US005908161A

United States Patent [19]

[11] Patent Number: 5,908,161

[45] Date of Patent: Jun. 1, 1999

Womac et al.

[54] VARIABLE FLOW CONTROL DEVICE FOR PRECISION APPLICATION

[75] Inventors: Alvin R. Womac, Louisville; Quy Duc Bui, Lexington, both of Tenn.

[73] Assignee: The University of Tennessee Research Corporation, Knoxville, Tenn.

[21] Appl. No.: 08/972,850

[22] Filed: Nov. 18, 1997

[51] Int. Cl.[6] .............................. B05B 1/30; B05B 15/00; F16K 7/04

[52] U.S. Cl. ....................... 239/583; 239/533.1; 239/546; 239/569; 251/5

[58] Field of Search .................................... 239/569, 583, 239/533.1, 88, 89, 546; 251/5, 4

[56] References Cited

U.S. PATENT DOCUMENTS

| | | | |
|---|---|---|---|
| 3,335,962 | 8/1967 | Schmidt | 239/569 X |
| 4,333,608 | 6/1982 | Hendry | 239/583 X |
| 5,011,081 | 4/1991 | Bentley | 239/569 |
| 5,524,829 | 6/1996 | Keim et al. | 239/569 X |

OTHER PUBLICATIONS

Miscellaneous information on Midwest Technologies, Inc. sprayer systems, 4 pages, date unknown.

Ciba–Geigy, Brochure on Direct Injection System "Agroinject," 8 pages, date unknown.

Micro–Trak Systems, Inc., Brochure on Trak–Net, Modular Monitoring and Control Network, 5 pages, 1993.

Raven Industries, Brochure on Chemical Injections Systems, 6 pages, date unknown.

Robert E. Wolf, "Development of a State of the Art Injection Sprayer for Use in Spraying Research Plots," Paper No. 961085, An ASAE Meeting Presentation, Phoenix, Arizona, 7 pages, Jul. 1996.

Capstan AG Systems, Inc., Brochure on Synchro, The New Generation of Ag Spraying Technology, 8 pages, date unknown.

*Primary Examiner*—Andres Kashnikow
*Assistant Examiner*—Sean P. O'Hanlon
*Attorney, Agent, or Firm*—Rosenblatt & Redano P.C.

[57] ABSTRACT

The present invention relates to an apparatus for variable flow control for precision applications, such as agrochemical applications. The invention is directed towards a flow control device comprising a metering rod moveably mounted within a housing. The position of the metering rod is controllable so as to control the flow rate, flow angle and/or droplet size of fluid passing through the flow control device of the present invention.

20 Claims, 3 Drawing Sheets

VARIABLE FLOW CONTROL DEVICE FOR PRECISION APPLICATION

BACKGROUND OF THE INVENTION

1. Field of the Invention

The present invention relates to an apparatus for variable flow control for precision applications, such as agrochemical applications. The invention is directed towards a flow control device comprising a metering rod moveably mounted within a housing. The position of the metering rod is controllable so as to control the flow rate, flow angle and/or droplet size of fluid passing through the flow control device of the present invention.

2. Description of the Prior Art

The ability to vary the application rate of agrochemicals is highly desirable in the field of precision farming. Variable rate applications of chemicals are desirable to respond to changes in soil and/or crop and/or pest conditions.

There are at least three prior art methods for variable rate agrochemical applications. The first method varies the nozzle pressure to alter the spray rate. This method is unsatisfactory because pressure must be increased by a factor of four in order to double the spray rate. Pressure increases of this magnitude decrease the droplet size and result in difficulties maintaining a selected spray pattern at low pressures.

A second prior art method of variable rate application is to equip an applicator with several application systems having different capacities. Such systems can be turned on or off in response to changes in crop and/or soil and/or pest conditions. This method is unsatisfactory because it is electromechanically complex and it provides only stepwise variations, rather than continuous variations, in flow rate. Stepwise variations limit the suitability of such devices for crop and/or soil and/or pest conditions that require only slight variations in application flow rates.

A third prior art method for achieving variable rats agrochemical application is the use variable rate flow control nozzles on a spray system, such as a boom sprayer. Prior art devices employing this method have incorporated pulsed solenoids into a nozzle body to control application rate and drop size. In a typical boom spray system, nozzles are spaced out approximately every 20 inches. In such a system, a pulsed solenoid flow control apparatus is electrically complex and subject to harsh boom conditions, and more importantly is limited in range of flow rate since the solenoid is only in series with a nozzle orifice.

The present invention provides a true variable rate flow control device which is robust and which is capable of controlling flow rate, droplet size, and/or spray angle through the use of a control pressure or other rod driving means.

SUMMARY OF THE INVENTION

The variable flow control device of the present invention comprises a housing having a top, a bottom, at least two opposite sides, and a central longitudinal channel having an upper region and a lower region. A metering rod is moveably mounted in the central longitudinal channel. The metering rod has an upper portion and lower portion. A metering rod driver is coupled to the upper portion of the metering rod such that downward movement of the driver results in downward movement of the metering rod and upward movement of the driver results in upward movement of the metering rod.

A supply pressure port is located in a side of the housing. A spray head is attached to the lower portion of the metering rod and is mounted in the lower portion of the longitudinal channel. The spray head has an upper and and a lower end. An expandable spray channel is centrally located in the spray head. A supply pressure volume extends from the supply pressure port to the spray channel.

DESCRIPTION OF THE PREFERRED EMBODIMENTS

Figure 1:
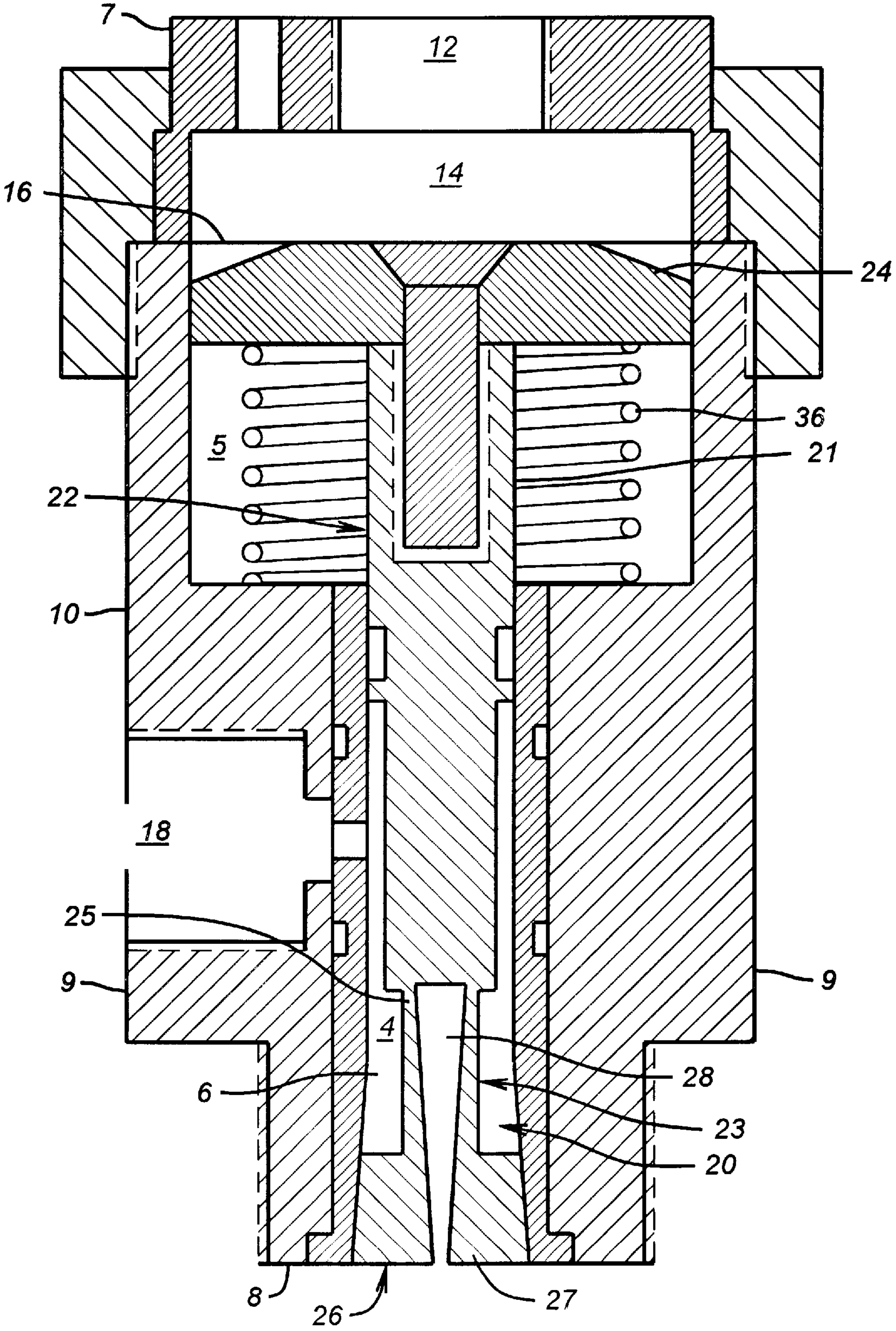
FIG. 1 is a side cross sectional view of a first embodiment of the present invention with the metering rod in an extended position.
Figure 2:
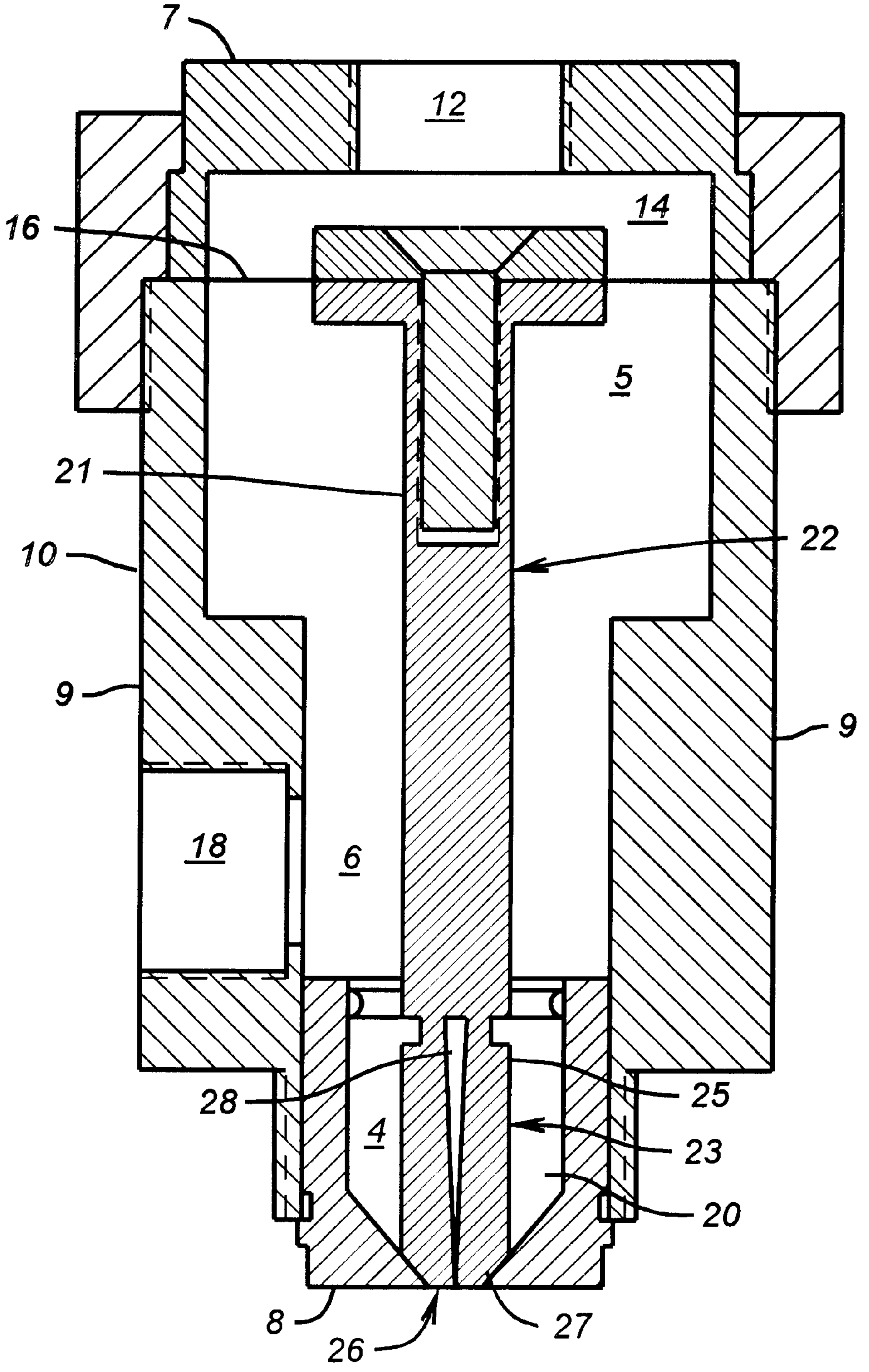
FIG. 2 is a side cross sectional view of a second embodiment of the present invention with the metering rod in an extended position.

The invention comprises a housing 10 having a top 7, a bottom 8, and at least two opposite sides 9, and central longitudinal channel 5, having an upper region 5 and a lower region 4, as shown in FIGS. 1 and 2. The housing may consist of a one piece structure or at may comprise several parts which are attached to each other such as by threaded fittings, welding, adhesive or pressfit.

In one preferred embodiment, as show in FIG. 1, the lower region of the longitudinal channel decreases in cross sectional area as a function of distance away from the bottom of the housing. In another preferred embodiment, as shown in FIG. 2, the lower region of the longitudinal channel increases in cross sectional area as a functional distance away from the bottom of the housing. The embodiment shown in FIG. 2 is capable of atomizing fluid elected from the bottom of the housing.

The invention further comprises a metering rod 22 moveably mounted in the central longitudinal channel, as shown in FIGS. 1 and 2. The metering rod has an upper portion 21 and lower portion 23. A metering rod driver 24 is coupled to the upper portion of the metering rod such that downward movement of the driver results in downward movement of the metering rod and upward movement of the driver results in upward movement of the metering rod. As shown in FIG. 1, the diameter of the lower portion of the metering rod 23 is less than the diameter of the spray head 25. Accordingly, lower region 4 is in fluid communication with the longitudinal channel because lower region 4 forms an annular region which surrounds lower portion 23 of the metering rod.

Figure 3:
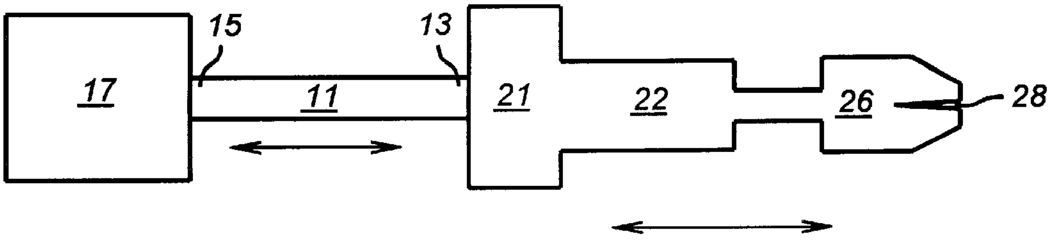
FIG. 3 is a side view of a second embodiment of the metering rod driver, metering rod, spray head and spray nozzle assembly of the present invention with the spray channel in the open position.

In a preferred embodiment as shown in FIG. 3, the driver comprises a mechanical linkage 11 having a first and 13 coupled to the upper portion of the metering rod and a second end 15 opposite the first and. The driver further comprises a stepper motor 17 coupled to the second and of the mechanical linkage. As shown by the horizontal arrows in FIG. 3, the stepper motor 17 is capable of driving the mechanical linkage 11 either toward or away from the stepper motor. In the preferred embodiments depicted in FIGS. 1 and 2, the coupling of the metering rod driver to the metering rod is a fluid coupling.

Figure 6:
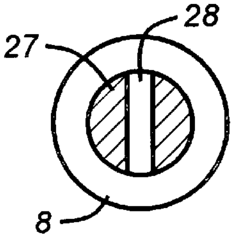
FIG. 6 is a bottom view of the spray head of FIG. 1.

The invention further comprises a supply pressure port 18 located in a side of the housing, as shown in FIGS. 1 and 2. A spray head 26 is attached to the lower portion of the metering rod and mounted in the lower portion of the longitudinal channel. The spray head has an upper end 25 and a lower end 27, as shown in FIGS. 1 and 2. An expandable spray channel 28 is centrally located in the spray head, as shown in FIGS. 1–4. In a preferred embodiment, the expandable channel extends across the spray head, as shown in FIG. 6.

Figure 4:
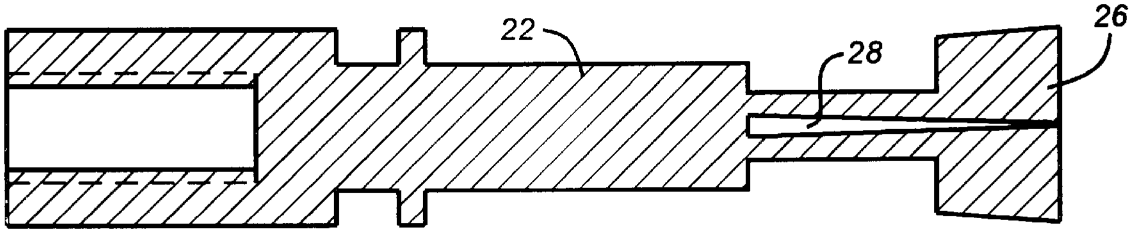
FIG. 4 is a side view of a first (embodiment of the metering rod and spray head with the spray channel in the closed position.

In a preferred embodiment the spray head is sized such that the expandable spray channel is open, as shown in FIG. 1, when the spray head extends to the bottom of the housing, and the expandable spray channel is closed, as shown in FIG. 4; when the spray head is in a retracted position within the longitudinal channel. The closure of the expandable channel results from interference between the lower end of the spray head and the tapered longitudinal channel. In a preferred embodiment, the lower end of the spray head is tapered at a substantially similar angle to the angle of the lower region of the longitudinal channel.

The spray head and housing configuration depicted in FIG. 2 is capable of atomizing fluid ejected from the bottom of the housing. The embodiment of the invention depicted in FIG. 2 is also capable of being operated so as to independently control the droplet size and flow rate of fluid ejected from the bottom of the housing.

Figure 5:
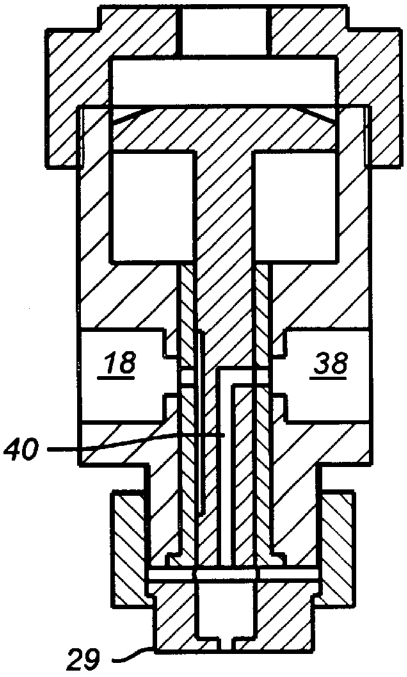
FIG. 5 is a side view of a third embodiment of the present invention.

A supply pressure volume 20 extends from the supply pressure port to the spray channel as shown in FIGS. 1 and 2. In a preferred embodiment, the invention further comprises a spray nozzle 29 in fluid communication with the spray channels as shown in FIG. 5.

In the preferred embodiment shown in FIGS. 1 and 2, a control pressure port 12 is located in the top of the housing. A pressure barrier 16 forms a seal which acts as a pressure barrier within the interior of the housing. The pressure barrier may be a diaphragm extending across the interior of the housing or an elastomeric member mounted on the metering rod. In a preferred embodiment, the elastomeric member is an O-ring as show in FIG. 1. A control pressure volume 14 is located in the housing above the diaphragm and below the control pressure port, as shown in FIGS. 1–2.

In a preferred embodiment, the O-ring mounted on the metering rod is sized to form a pressure barrier between the control pressure volume and the supply pressure volume. When the elastomeric member is positioned so as to provide a pressure barrier between the supply pressure and the control pressure, it is possible to control metering rod movement by varying control pressure. As shown in FIG. 1, the surface area upon which control pressure acts is substantially larger than the surface area upon which supply pressure acts.

In the embodiment of the invention shown in FIG. 2, the movement of the diaphragm is a function of the differential pressure between the control pressure exerted in the control pressure volume and the supply pressure exerted in the supply pressure volume. In this embodiment of the invention, the control pressure, supply pressure, and diaphragm provide position control capability for the metering rod.

The metering rod 22 is centrally located and moveably mounted in the longitudinal channels. The metering rod extends through the diaphragm as shown in FIG. 2. The metering rod comprises an upper portion in contact with the diaphragm and a lower portion opposite the upper portion.

In the preferred embodiment of the invention shown in FIG. 1 control pressure enters the housing through the control pressure port and acts against the diaphragms causing it to expand or retract, as a function of control pressure. The movement of the diaphragm results in axial displacement of the metering rod within the longitudinal channel. In this embodiment, the control pressure and diaphragm function as a metering rod driver. A supply pressure port 18 is located in a side of the housing below the diaphragm.

The embodiment of the invention shown in FIG. 1 further comprises at least one spring 36 coupled to the metering rod so as to oppose any downward acting pressure in the control pressure volume, as shown in FIG. 1. The spring supplies a restoring force which will result in the metering rod being in the retracted position, when the force resulting from the control pressure acting against the diaphragm is less than the restoring force of the spring.

In another preferred embodiment, the invention further comprises an air port 38 located in a side of the housing opposite from the supply pressure port and an air channel 40 extending from the air port to the spray channel, as shown in FIG. 5. The air port and air channel provide a means for atomizing fluid that is sprayed from the end of the spray channel. This embodiment of the invention may further comprise a spray nozzle in fluid communication with the spray channel.

The foregoing disclosure and description of the invention are illustrative and explanatory thereof, and various changes in the size, shape and materials, as well as in the details of the illustrated construction, may be made without departing from the spirit of the invention.

What is claimed is:

1. A variable flow control device, comprising:

a. a housing having a top, a bottom, at least two opposite sides, and a central longitudinal channel having an upper region and a lower region, b. a metering rod moveably mounted in said central longitudinal channel, said metering rod having an upper portion and a lower portion;

c. a metering rod driver coupled to the upper portion of said metering rod such that downward movement of said driver results in downward movement of said metering rod and upward movement of said driver results in upward movement of said metering rod;

d. a supply pressure port located in a side of said housing;

e. a spray head attached to the lower portion of said metering red and mounted in the lower portion of said longitudinal channel, said spray head having an upper end and a lower end;

f. an expandable spray channel centrally located in said spray head; and g. a supply pressure volume extending from said supply pressure port to said spray channel.

2. The device of claim 1, wherein said driver comprises:

a. a mechanical linkage having a first end coupled to the upper portion of said metering rod and a second and opposite said first end; and b. a stepper motor coupled to the second and of said mechanical linkage.

3. The device of claim 1, further comprising a spray nozzle in fluid communication with said spray channel.

4. The device of claim 1, wherein the lower region of said longitudinal channel is tapered such that its diameter decreases as a function of distance away from the bottom of said housing.

5. The device of claim 4, wherein said spray head is sized such that said expandable channel is open when said spray head extends to the bottom of said housing and said expandable channel is closed as a result of interference from said tapered longitudinal channel when said spray head is in a retracted position within said longitudinal channel.

6. The device of claim 5 wherein the lower end of said spray head is tapered at a substantially similar angle to the angle of the lower region tapering in said longitudinal channel.

7. A variable flow control device, comprising:

a. a housing having a top, a bottom, at least two opposite sides, and a central longitudinal channel having an upper region and a tapered lower region which decreases in cross sectional area as a function of distance away from the bottom of said housing;

b. a control pressure port located in the top of said housing;

c. a pressure barrier forming a seal within the interior of said housing;

d. a control pressure volume in said housing above said pressure barrier and below said control pressure port;

e. a supply pressure port located in a side of said housing below said diaphragm;

f. a metering rod centrally located and moveably mounted in said longitudinal channel and extending through said pressure barrier, said metering red comprising an upper portion in contact with said diaphragm and a lower portion opposite said upper portion, g. a spray head attached to the lower portion of said metering rod and mounted in the lower region of said longitudinal channel, said spray head having an upper end and a lower end, h. an expandable spray channel centrally located in said spray head, i. a supply pressure volume extending from said supply pressure port to said spray channel; and j. at least one spring coupled to said metering rod so as to oppose any downward acting pressure in said control pressure volume on said diaphragm.

8. The device of claim 7, wherein said spray head is sized such that said expandable channel is open when said spray head extends to the bottom of said housing and said expandable channel is closed as a result of interference from said tapered longitudinal channel when said spray head is in a retracted position within said longitudinal channel.

9. The device of claim 7 wherein the lower and of said spray head is tapered at a substantially similar angle to the angle of the lower region tapering in said longitudinal channel.

10. The device of claim 7, further comprising:

a. an air port located in a side of said housing opposite from said supply pressure port; and b. an air channel extending from said air port to said spray channel.

11. The device of claim 6 further comprising a spray nozzle in fluid communication with said spray channel.

12. The device of claim 7 wherein said pressure barrier is a diaphragm.

13. The device of claim 7 wherein said pressure barrier is an elastomeric member.

14. The device of claim 13 wherein said elastomeric member is an O-ring.

15. A variable flow control device comprising:

a. a housing having a top, a bottom, at least two opposite sides, and a central longitudinal channel having an upper region and a tapered lower region which increases in cross sectional area as a function of distance away from the bottom of said housing;

b. a control pressure port located in the top of said housing;

c. a pressure barrier forming a seal within the interior of said housing;

d. a control pressure volume in said housing above said pressure barrier;

e. a supply pressure port located in a side of said housing below said pressure barrier;

f. a metering rod centrally located and moveably mounted in said longitudinal channel and extending through said pressure barrier, said metering rod comprising an upper portion in contact with said diaphragm and a lower portion opposite said upper portion;

g. a spray head attached to the lower portion of said metering rod and mounted in the lower region of said longitudinal channel, said spray head having an upper end and a tapered lower end, h. an expandable spray channel centrally located in said spray head; and i. a supply pressure volume extending from said supply pressure port to said spray channel.

16. The device of claim 15, wherein said spray head is sized such that said expandable channel is closed as a result of interference from said tapered longitudinal channel, when said spray head extends to the bottom of said housing and said expandable channel is open when said spray head is in a retracted position within said longitudinal channel.

17. The device of claim 16, wherein the lower end of said spray head is tapered at a substantially similar angle to the angle of the lower region tapering in said longitudinal channel.

18. The device of claim 15, wherein said expandable channel extends across said spray head.

19. The device of claim 15, wherein said pressure barrier is a diaphragm.

20. The device of claim 15, further comprising a spray nozzle in fluid communication with said spray channel.

* * * * *

UNITED STATES PATENT AND TRADEMARK OFFICE

CERTIFICATE OF CORRECTION

PATENT NO. : 5,908,161

DATED : June 1, 1999

INVENTOR(S) : Alvin R. Womac, et al.

It is certified that error appears in the above-indentified patent and that said Letters Patent is hereby corrected as shown below:

On Sheet 3 of 3 in the drawings, please delete

"

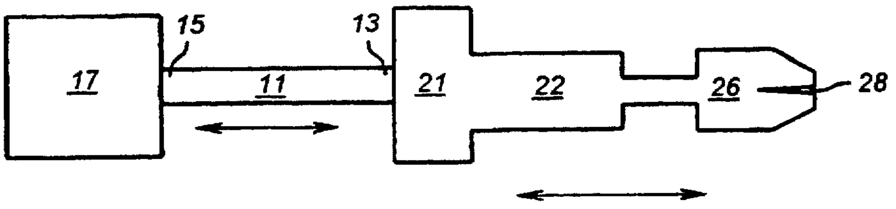

FIG. 3

"

and insert

UNITED STATES PATENT AND TRADEMARK OFFICE

CERTIFICATE OF CORRECTION

PATENT NO. : 5,908,161

DATED : June 1, 1999

INVENTOR(S) : Alvin R. Womac, et. al.

It is certified that error appears in the above-indentified patent and that said Letters Patent is hereby corrected as shown below:

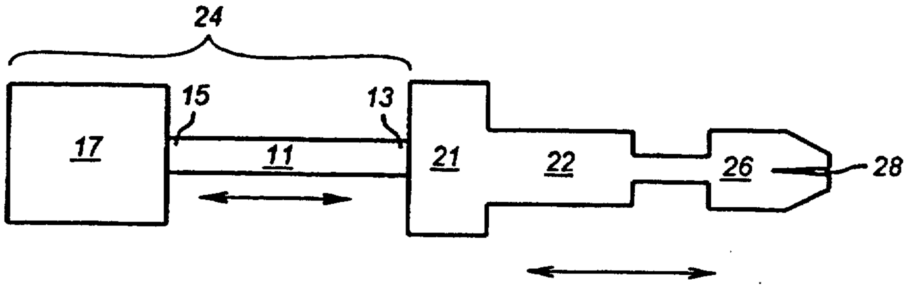

FIG. 3

Signed and Sealed this

Nineteenth Day of October, 1999

Attest:

Q. TODD DICKINSON

Attesting Officer

*Acting Commissioner of Patents and Trademarks*